(12) United States Patent
Hunter (10) Patent No.: US 7,383,344 B2
(45) Date of Patent: Jun. 3, 2008

(54) REMOTE ENCODER SYSTEM AND METHOD FOR CAPTURING THE LIVE PRESENTATION OF VIDEO MULTIPLEXED WITH IMAGES

(75) Inventor: Kurt M. Hunter, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1171 days.

(21) Appl. No.: 10/366,741

(22) Filed: Feb. 14, 2003

(65) Prior Publication Data

US 2004/0160992 A1 Aug. 19, 2004

(51) Int. Cl.
*G06F 15/16* (2006.01)

(52) U.S. Cl. ............... 709/231; 375/240.01; 348/423.1

(58) Field of Classification Search ........ 709/200–202, 709/231; 370/493, 509; 348/423.1; 375/240.01
See application file for complete search history.

(56) References Cited

U.S. PATENT DOCUMENTS

| 5,550,966 | A | * | 8/1996 | Drake et al. ............. 707/104.1 |
| 5,583,652 | A | * | 12/1996 | Ware .......................... 386/75 |
| 6,041,345 | A | | 3/2000 | Levi et al. |
| 6,078,597 | A | * | 6/2000 | Feuer ........................... 372/6 |
| 6,094,213 | A | * | 7/2000 | Mun et al. ................ 348/14.05 |
| 6,374,039 | B1 | * | 4/2002 | Hori et al. .................. 386/117 |
| 6,760,539 | B2 | * | 7/2004 | Asada et al. ................... 386/94 |
| 6,789,208 | B2 | | 9/2004 | Noda et al. |
| 6,833,865 | B1 | | 12/2004 | Fuller et al. |
| 6,845,107 | B1 | * | 1/2005 | Kitazawa et al. ........... 370/537 |
| 6,854,830 | B2 | * | 2/2005 | Gue et al. ...................... 347/61 |
| 6,879,769 | B1 | * | 4/2005 | Kawai et al. ................. 386/52 |
| 6,954,830 | B2 | * | 10/2005 | Yamada et al. ............. 711/154 |
| 7,221,857 | B2 | * | 5/2007 | Zimmermann ............. 386/124 |
| 2002/0136241 | A1 | * | 9/2002 | Pasqualino et al. ......... 370/493 |
| 2003/0194008 | A1 | | 10/2003 | Acharya et al. |
| 2004/0001106 | A1 | | 1/2004 | Deutscher et al. |
| 2004/0223747 | A1 | | 11/2004 | Otala el al. |
| 2007/0033528 | A1 | * | 2/2007 | Merril et al. ................ 715/732 |

OTHER PUBLICATIONS

Spooner, J., "Intel Dreams of the Wireless Home," ZDNet News, Sep. 12, 2002, 2 pages.

* cited by examiner

*Primary Examiner*—Moustafa Meky
(74) *Attorney, Agent, or Firm*—Senniger Powers LLP (57) ABSTRACT

A system for use with a speaker providing audio and video in conjunction with images being provided by a podium computer responsive to the speaker as part of a live multimedia presentation. A device provides video signals and audio signals wherein the video signals correspond to the video provided by the speaker and the audio signals correspond to the audio provided by the speaker. A transmitter transmits a signal corresponding to a timing of images occurring simultaneously with the video and audio. A receiver receives the transmitted signal. A video channel converts the video signal into a digital video signal. An audio channel converts the audio signal into a digital audio signal. A receiver channel responsive to the receiver provides a timing signal corresponding to the transmitted signal and representing a timing of the images relative to the video and the audio. A media stream multiplexer multiplexes the digital video signal, the digital audio signal and the timing signal into an ISM (immediately stream-able media) format.

26 Claims, 4 Drawing Sheets

FIG. 3

REMOTE ENCODER SYSTEM AND METHOD FOR CAPTURING THE LIVE PRESENTATION OF VIDEO MULTIPLEXED WITH IMAGES

TECHNICAL FIELD

The present invention relates to the field of multimedia streaming and to a system and method for capturing a live multimedia presentation. In particular, the invention relates to a system and method for simultaneously capturing a live presentation including audio, video and events, such as mouse clicks, associated with the sequential presentation of images.

BACKGROUND OF THE INVENTION

Live presentations including audio and/or video and/or images are often generically called "multimedia" or simply "media." A presently popular "media" application is to digitize audio and video clips. Typically, media is digitized using a video capture application. A video capture application converts analog video signals, such as those generated by a video camera, into a digital media format signal and then stores the digital signal on a computer's mass storage system. Typically, video capture from analog devices requires a special video capture card that converts the analog signals into digital signals and compresses the data. Such video capture cards usually capture video and audio. Thus, as used herein, "video" may include video information and its associated audio information.

Alternatively, external video capture devices exist that capture video signals from an attached camera and transfer them to a computer via a communications cable. The external video capture devices are often desirable because they are easier to install and use than internal devices. Therefore, they are usually preferred by a less-experienced computer user. Examples of such external video capture devices include "QuickClip" by Logitech; "In Video USB Capture" by Focus Enhancements; "InterView USB" by Interex, Inc.; and "USB Live! Video Adapter" by Nogatech Inc.

When an external device is used, the media (i.e., video and/or audio and/or images) signal is typically compressed within the external device before the signal is sent to the coupled computer. The signal is compressed because the communications connection between the device and the computer typically has a limited bandwidth. The computer-device interface normally cannot transmit the uncompressed media signal at the rate that the device receives the signal. Compressing the media signal allows it to flow smoothly and without loss across the limited-bandwidth connection to the computer.

If the computer-device interface was capable of transmitting the uncompressed media signal, the signal may overwhelm many existing computers. They are simply not powerful enough to process such a large amount of data in such a short time period. Most of the conventional, external, video-capture devices use a proprietary media-compressing scheme. They proprietarily compress the media data and transmit it to the computer. The computer simply stores the proprietarily compressed media data into a file. Alternatively, using proprietary software on the computer, the media data is decompressed. After the media data is decompressed, it is recompressed and stored using a standard media file format, such as MPEG, QuickTime, or Windows Media Format (which is also called ASF for advanced streaming format, active stream format or advanced system format).

The media data is recompressed to save space on the computer's mass storage system. The media data is stored in a standard media file format so that it may usable by a large array of general-purpose media applications.

Considering an ASF file as exemplary, it contains one or more multimedia streams, as disclosed in U.S. Pat. No. 6,041,345. A multimedia stream contains the data for one particular part of the overall ASF file. For instance, a typical ASF file might contain three multimedia streams, one containing the audio data for the file, another containing the video data for the file and a third containing markers and/or executable script to allow to synchronization with the audio and video playback. Playback of an ASF file (either over a network or via the local hard drive) is done by playing the data from one or more of the multimedia streams. In the past, these files have been manually assembled separately capturing the multimedia streams and manually or automatically (via software) combining and synchronizing various multimedia streams.

One problem posed by manual assembly of separate streams is capturing a live presentation in such a way that it can be transmitted as immediate streaming media, such as an ASF file.

For these reasons, there is a need for a system and method for facilitating the simultaneous capture of a live multimedia presentation including audio, video and synchronization events to allow for the playback of the captured audio and video and the synchronized changes to the image presentation as part of the live multimedia presentation.

SUMMARY OF THE INVENTION

The invention includes a simple set-top hardware device that: 1) greatly simplifies the creation of media content such as Windows® media content, 2) allows for the simultaneous capture of video of a presenter and the mouse clicks associated with the advancing of the visual images, such as images of a PowerPoint® presentation, 3) is low cost, and 4) provides a capture solution for personal computers with a network connection to enable the creation of digital media content especially for use with software programs for editing multimedia, such as Microsoft® Producer™ software.

In particular, the invention includes a device that allows production workers to simply and easily capture a live presentation including talking head video multiplexed with mouse key events of an image presentation for the purpose of creating an on-demand media presentation and, in addition, allows for the wireless (or wired) network capture of encoded video from any video device.

In one form, the invention may be implemented as a small device with RCA audio (left/right), RCA composite video and/or S-Video input connectors supporting NTSC and/or PAL video; a Bluetooth receiver; Ethernet network connector (100 BaseT); and wireless network capability (e.g., 802.11b). Audio and video are received via the audio/video connectors and mouse-clicks are received via the Bluetooth or wireless network. The device may include a USB-based Bluetooth transmitter dongle for connecting to a podium computer to transmit the mouse-click events to the Bluetooth receiver of the device. Contained within the device are video and audio encoders. The device provides a stream of compressed media with time synchronized, multiplexed mouse-click events to a networked host in a format that can be simply written to an ASF file, prepared for instant streaming, and/or decoded for display. Thus, the device is primarily an input device with output over a network to a networked host computer. Preferably, the device driver will allow for the software selection of the compression rate of the device and any other set up. This can be done from either the Bluetooth-based transmitter or the network connected receiving host.

In accordance with one aspect of the invention, an apparatus provides multiplexed video, audio and events indicated by a transmitted signal. A video channel receives the video and provides a digital video signal corresponding thereto. An audio channel receives the audio and provides a digital audio signal corresponding thereto. A receiver channel provides a timing signal corresponding to the transmitted signal and representing a timing of the events relative to the video and the audio. A media stream multiplexer multiplexes the digital video signal, the digital audio signal and the timing signal into an ISM (immediately stream-able media) format.

In accordance with another aspect of the invention, an apparatus provides multiplexed video, audio and events. A transmitter transmits a signal corresponding to a timing of the events. A receiver receives the transmitted signal. A video channel converts the video into a digital video signal. An audio channel converts the audio into a digital audio signal. A receiver channel responsive to the receiver provides a timing signal corresponding to the transmitted signal and representing a timing of the events relative to the video and the audio. A media stream multiplexer multiplexes the digital video signal, the digital audio signal and the timing signal into an ISM (immediately stream-able media) format.

In accordance with another aspect of the invention, a system for use with a speaker provides audio and video in conjunction with images being provided by a podium computer responsive to the speaker. A device provides video signals and audio signals wherein the video signals correspond to the video provided by the speaker and the audio signals correspond to the audio provided by the speaker. A transmitter transmits a signal corresponding to a timing of images occurring simultaneously with the video and audio. A receiver receives the transmitted signal. A video channel converts the video signal into a digital video signal. An audio channel converts the audio signal into a digital audio signal. A receiver channel responsive to the receiver provides a timing signal corresponding to the transmitted signal and representing a timing of the images relative to the video and the audio. A media stream multiplexer multiplexes the digital video signal, the digital audio signal and the timing signal into an ISM (immediately stream-able media) format.

In accordance with another aspect of the invention, an encoder includes a computer readable medium having computer executable instructions provides multiplexed video, audio and events indicated by a transmitted signal. The instructions comprise:
  video instructions for converts the video into a digital video signal;
  audio instructions for converts the audio into a digital audio signal;
  receiver instructions for provides a timing signal corresponding to the transmitted signal and representing a timing of the events relative to the video and the audio;
  a media stream multiplexer for multiplexes the digital video signal, the digital audio signal and the timing signal into an ISM (immediately stream-able media) format.

In accordance with another aspect of the invention, a method provides multiplexed video, audio and events indicated by a transmitted signal. The method:
  converts the video into a digital video signal;
  converts the audio into a digital audio signal;
  generating a timing signal corresponding to the transmitted signal and representing a timing of the events relative to the video and the audio;
  multiplexes the digital video signal, the digital audio signal and the timing signal into an ISM (immediately stream-able media) format;

In accordance with another aspect of the invention, a media converter provides multiplexed video, audio and events indicated by a transmitted signal. A media compressor generates compressed media data of the video, the audio and the events in an immediately stream-able media (ISM) format from a digitized media input of the video and audio and from the transmitted signal. A computer interface, coupled to the compressor, receives the media data in the ISM format and transmits it to a computer using a communications protocol. The ISM format is a media format needing no format modifications by the computer for the compressed media data in such format to be transmitted over a network coupled to the computer and to be viewed by a streaming media player.

In accordance with another aspect of the invention, a media conversion method provides multiplexed video, audio and events indicated by a transmitted signal comprising:
  compressing digital media corresponding to the video, the audio and the events into compressed media data in an immediately stream-able media (ISM) format,
  sending the compressed media data in the ISM format to a computer by using a communications protocol over a communications protocol interface,
  transmitting to a streaming media player, over a network coupled to the computer, the compressed media data in the ISM format without any format modifications by the computer.

In accordance with another aspect of the invention, a computer-readable medium having computer-executable instructions that, when executed by a computer, performs the method comprising:
  a media compressor generating compressed media data in an immediately stream-able media (ISM) format from a digitized media input. and
  a computer interface, coupled to the compressor, to receive the media data in to the ISM format and transmit it to a computer using a communications protocol.
  the ISM format being a media format needing no format modifications by the computer for the compressed media data in such format to be transmitted over a network coupled to the computer and to be viewed by a streaming media player.

In accordance with another aspect of the invention, an apparatus provides multiplexed video and audio. A video channel converts the video into a digital video signal. An audio channel converts the audio into a digital audio signal. A media stream multiplexer multiplexes the digital video signal and the digital audio signal into an ISM (immediately stream-able media) format.

In accordance with another aspect of the invention, a system for use with a speaker provides audio and video. A device provides video signals and audio signals wherein the video signals correspond to the video provided by the speaker and the audio signals correspond to the audio provided by the speaker. A video channel converts the video signal into a digital video signal. An audio channel converts the audio signal into a digital audio signal. A media stream multiplexer multiplexes the digital video signal and the digital audio signal into an ISM (immediately stream-able media) format.

In accordance with another aspect of the invention, an encoder including a computer readable medium having computer executable instructions for provides multiplexed video and audio, the instructions comprising:

video instructions for converts the video into a digital video signal;

audio instructions for converts the audio into a digital audio signal;

a media stream multiplexer for multiplexes the digital video signal and the digital audio signal into an ISM (immediately stream-able media) format.

In accordance with another aspect of the invention, a method for provides multiplexed video and audio comprising converting the video into a digital video signal, converting the audio into a digital audio signal and multiplexing the digital video signal and the digital audio signal into an ISM (immediately stream-able media) format.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The system and method according to the invention addresses capturing live multimedia presentations which may include audio, video and other events, such as the presentation of images synchronized with the audio and video, for the purpose of making a digital copy of the live multimedia presentation in the form of digital media signals so that the digital media signals may be provided in an on demand format either simultaneously and/or at a later date. As a specific example, the system and method according to the invention encodes video into a Windows® Media format and synchronizes advancement events of Microsoft Power-Point® slides using Microsoft® Producer™ editing software. The method and system of the invention also permits digitizing analog audio, analog video signals and mouse click events to be provided as digital signals to a single computer.

Figure 1:
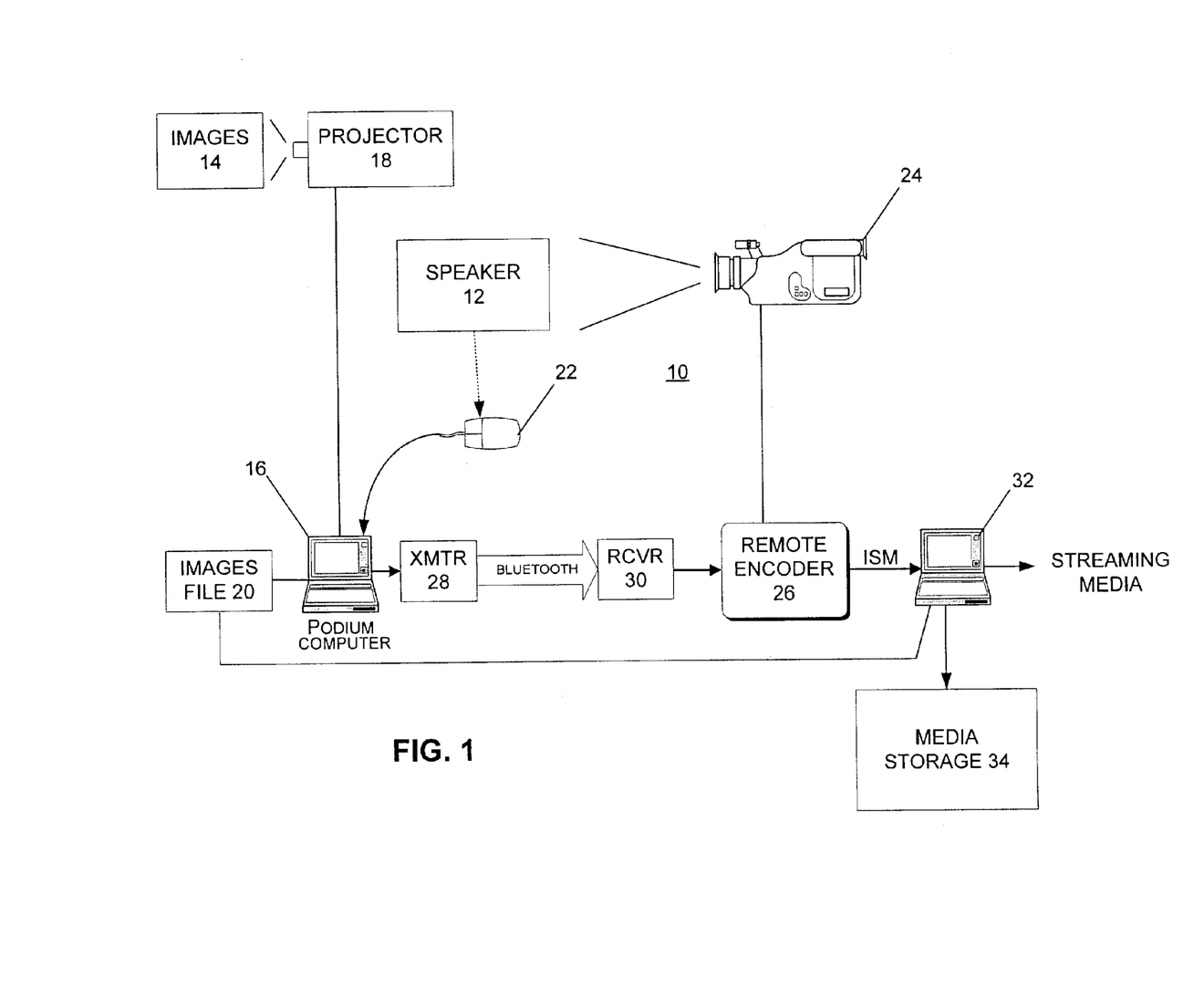
FIG. 1 is an exemplary block diagram illustrating one preferred embodiment of a system according to the invention.

FIG. 1 is an exemplary block diagram illustrating one preferred embodiment of a system 10 according to the invention. The system 10 is for use with a speaker 12 who may be providing audio and/or video in conjunction with images 14 being provided by a podium computer 16 responsive to the speaker 12. In one form, the images 14 may be generated by a projector 18 which receives the images from the podium computer 16 having access to stored image files 20. During the course of a live presentation, the speaker 12 advances from one image 14 to the next in a sequential manner by providing an event indication to the podium computer 16. For example, a key on the keyboard of the computer 16 may be depressed or one of the buttons on a mouse 22 connected to the computer 16 may be depressed to indicate that the next image in the sequence of images 14 in file 20 should be presented by the computer 16 to the projector 18 for display.

A camera 24 or other audio/video capture device is provided for converting the audio and video of speaker 12 as part of the live presentation into analog audio signals and analog video signals. Thus, these analog signals correspond to the audio and video of the live multimedia presentation being provided by the speaker 12. The system 10 includes a remote encoder 26 for receiving the analog audio signals and converting them into corresponding digital audio signals and for receiving the analog video signals and converting them into corresponding digital video signals. A transmitter 28 associated with the podium computer 16 transmits a signal corresponding to an event time of the images 14 being presented simultaneously with the live audio and video of the live multimedia presentation by the speaker 12. A receiver 30 associated with the remote encoder 26 receives the transmitted signal from the transmitter 28. The encoder 26 includes a receiver channel responsive to the receiver 30 for providing a timing signal corresponding to the transmitted signal and representing a timing of the images relative to the live audio and the live video.

As illustrated for exemplary purposes only, a wireless protocol such as BLUETOOTH may be used to establish communication between the podium computer 16 and the encoder 26. The transmitter 28 may be a USB-based BLUETOOTH transmitter dongle which would interface with the podium computer 16 to transmit mouse click events to a BLUETOOTH receiver 30. The podium computer 16 would also include interface software which would detect the mouse clicks or other events from the speaker 12 indicating the changing of images and would convert the detected events into a signal which would be communicated to the BLUETOOTH transmitter.

The remote encoder 26 would include a media stream multiplexer for multiplexing the digital video signal, the digital audio signal and the timing signal provided by the receiver 30 into an immediately stream-able media (ISM) format. This format signal may be provided to a computer 32 for storage on a media storage 34 (e.g., CD-ROM), or for immediate viewing as streaming media, or for presentation to other devices as streaming media, via a network connection.

Figure 2:
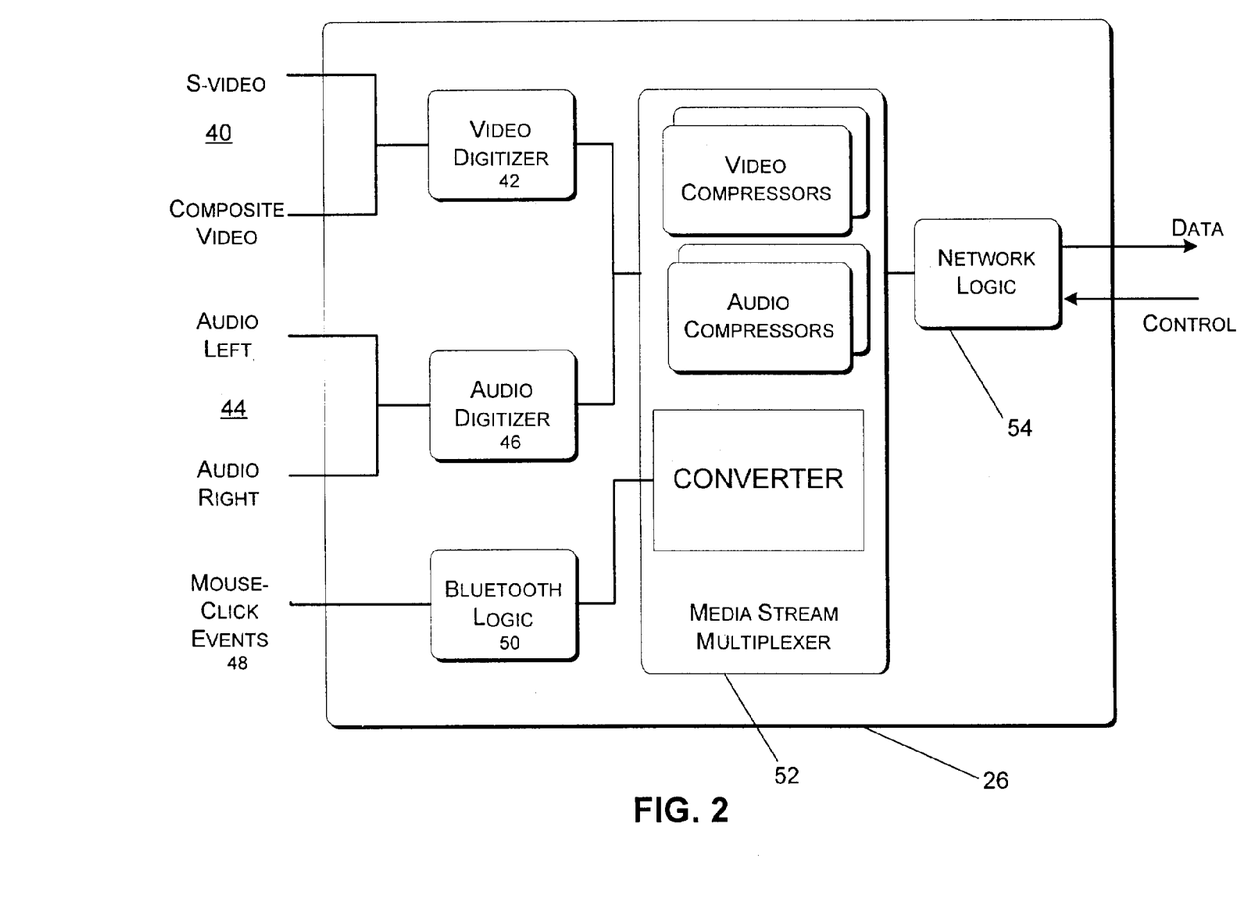
FIG. 2 is an exemplary block diagram illustrating one preferred embodiment of a remote encoder of the system of FIG. 1 according to the invention.

FIG. 2 illustrates the remote encoder 26 in further detail in block diagram form. As noted above, the encoder 26 provides multiplexed video, audio and events indicated by a transmitted signal in the form of data. The encoder 26 includes a video channel 40 for receiving the analog video from the camera 24 so that it can be converted into a digital video signal. As illustrated, the video channel may have an S-video input connector or an RCA composite video input connector or some other video input port supplying the analog video signal to a video digitizer 42 which converts the analog video signal into a digital video signal. The encoder 26 also includes an audio channel 44 preferably having an RCA audio left input connector and an RCA audio right input connector, receiving the analog audio and supplying it to an audio digitizer 46 for converting the analog audio into a digital audio signal. In addition, the encoder 26 includes a receiver channel 48 for receiving signals representative of the mouse clicks or other events and providing a timing signal corresponding to the transmitted signals and representing a timing of the events relative to the live video and live audio being provided by the speaker 12. In the case of a BLUETOOTH protocol, the receiver channel would include BLUETOOTH logic 50 for converting the signal. In addition, the encoder 26 includes a media stream multiplexer 52 for multiplexing the digital video signal, the digital audio signal and the timing signal into an immediately stream-able media format (ISM) provided to network logic 54 to be further provided as data under the control of a control signal.

Contained within the device 26 are video and audio compressors. The device 26 provides a stream of compressed media with time synchronized, multiplexed mouse-click events to a networked host in a format that can be simply written to an ASF file, prepared for instant streaming, and/or decoded for display. Thus, the device 26 is primarily an input device with output over a network to a networked host computer. Preferably, the device driver will allow for the software selection of the compression rate of the device and any other set up. This can be done from either the BLUETOOTH based transmitter 28 or from a control signal provided via the network logic connected to the receiving host.

Figure 3:
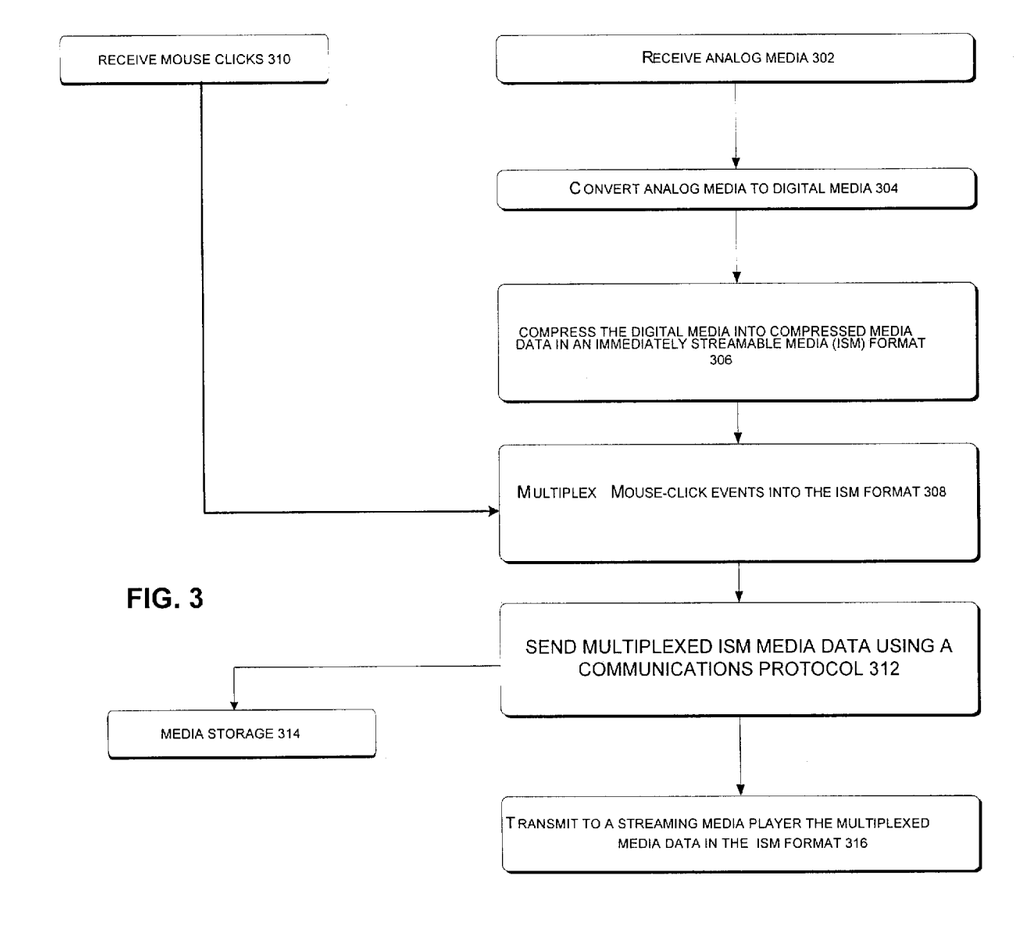
FIG. 3 is an exemplary flow chart illustrating the operation of the encoder of FIG. 2 and one preferred embodiment of the method according to the invention.

Referring to FIG. 3, an exemplary block diagram of a flow chart illustrating the operation of the encoder 26 of FIG. 2 and one preferred embodiment of the method according to the invention is illustrated. Initially, at 302 the remote encoder 26 receives the media including analog audio signals and analog video signals. At 304, the analog media is converted into digital media including corresponding digital audio signals and corresponding digital video signals by the audio digitizer 46 and the video digitizer 42, respectively. At 306, the digitized media is compressed into a compressed media data in an immediately stream-able media (ISM) format by the multiplexer 52 including the video compressors and the audio compressors. As the media is being streamed, mouse-click events indicating change to a particular displayed image are multiplexed into the ISM format at 308. These mouse clicks are received from the podium computer 16 as indicated at 310 and supplied to the multiplexer 52 via the BLUETOOTH logic 50. At 312, the multiplexed ISM media data is sent using the communications protocol. The data is either sent to a media storage 32 or may be transmitted directly by a computer or a server to a streaming media player so that the multiplexed media data in the ISM format may be displayed.

The encoder 26 and particularly the encoder 26 within the context of system 10 provides several advantages. It creates digital audio signals and digital video signals specifically in the ASF format, namely Windows® Media format. In addition, the encoder 26 and system 10 offer the following advantages:

Provides a method and system for easy video capture of the "talking head" portion of a live multimedia (video and audio) presentation while simultaneously capturing the synchronization of the timing of synchronized events such as slide advancement;

Provides a capture solution that does not require insertion of a PCI card (or other opening of a personal computer case to access a slot) and can be remote on a wireless or wired network;

Can be used to create Windows® Media video from video devices (camcorders, etc.) or Windows® Media audio from any audio device (walkmans, turntables, etc.).

Can be used with any video device (VHS, 8 mm, DV, Laserdisc, DVD) because it is format independent;

With device drivers and a simple capture application, it is easily be ported to other operating systems platforms;

Easy, low-cost creation of Windows® Media content;

The encoder 26 and system 10 address the difficulty associated with capturing video, audio and synchronization events during at a live presentation for the purpose of making the live presentation available in an on-demand format later. The encoding of video and audio into Windows® Media and synchronizing the Microsoft Power-Point® slide advancement events are a difficult part of the process of using production software. This invention reduces the difficulty.

In addition, the encoder 26 and system 10 address the problem that most consumers do not have an easy solution for digitizing audio and video for their computer. As a network-based device, it is easy to install in that it does not require opening the computer case to install an add-on card and it can be installed without shutting down the host computer. The encoder 26 contains hardware implementations of the video and audio compressors, therefore, does not rely on CPU-based software solutions that limited by the performance of the CPU. The encoder 26 will work on nearly all computers with USB ports. The utilization of the Windows® Media format allows for high compression of video, audio and event data allowing the user to store large quantities of digital media of a live presentation on their hard drive storage system.

Figure 4:
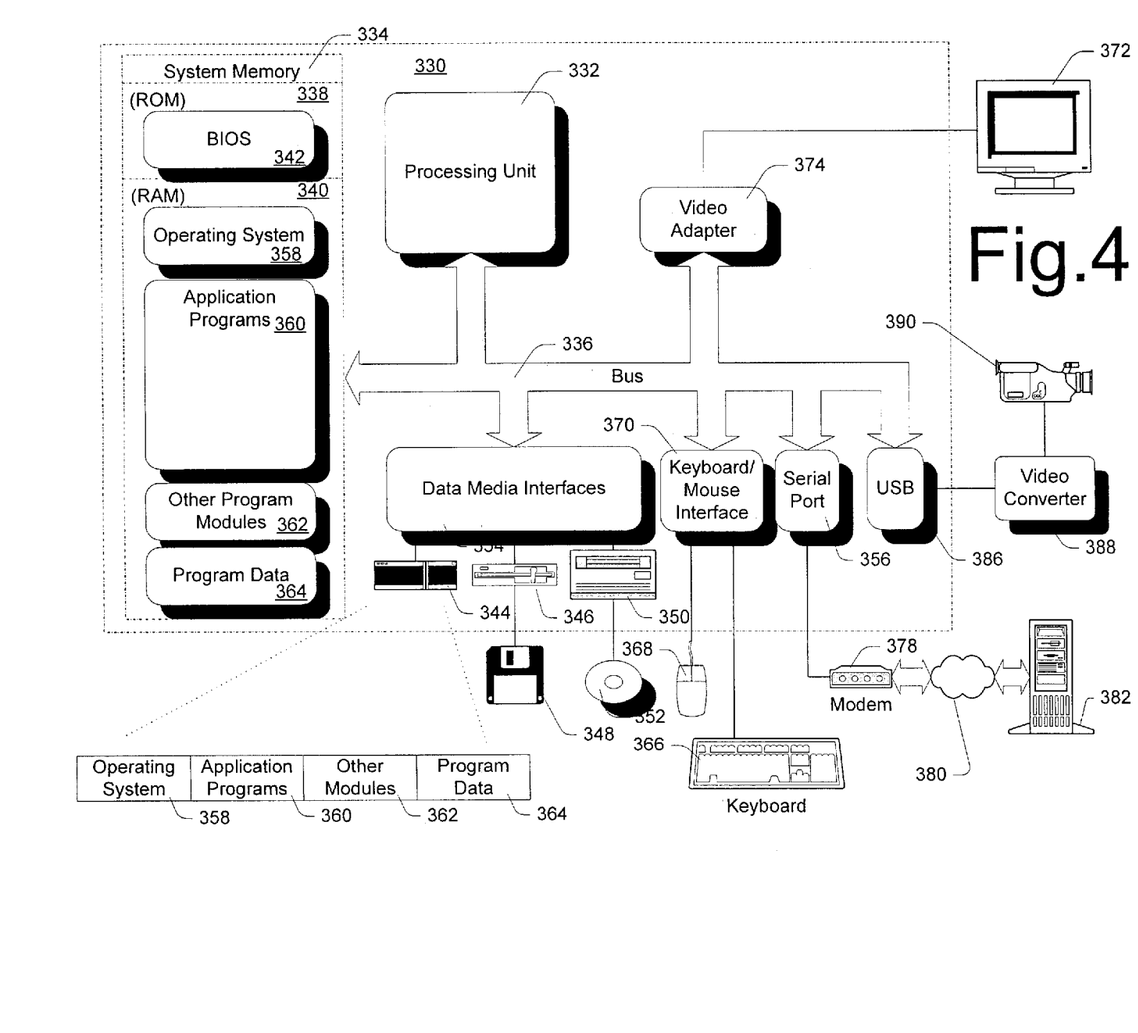
FIG. 4 is a block diagram illustrating one example of a suitable computing system environment capable of providing mouse-click events or for use as a streaming media input port.

FIG. 4 shows one example of a general purpose computing device in the form of a computer 330 which may be the podium computer 16 or the host computer 32. FIG. 4 is a block diagram illustrating one example of a suitable computing system environment capable of providing mouse-click events to encoder 26 or for use as a streaming media input port receiving the ISM from the output of encoder 26. In one embodiment of the invention, a computer such as the computer 330 is suitable for use in the other figures illustrated and described herein. Computer 330 has one or more processors or processing units 332 and a system memory 334. In the illustrated embodiment, a system bus 336 couples various system components including the system memory 334 to the processors 332. The bus 336 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 330 typically has at least some form of computer readable media. Computer readable media, which include both volatile and nonvolatile media, removable and non-removable media, may be any available medium that can be accessed by computer 330. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 330. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 334 includes computer storage media in the form of removable and/or non-removable, volatile and/or nonvolatile memory. In the illustrated embodiment, system memory 334 includes read only memory (ROM) 338 and random access memory (RAM) 340. A basic input/output system 342 (BIOS), containing the basic routines that help to transfer information between elements within computer 330, such as during start-up, is typically stored in ROM 338. RAM 340 typically contains data and/or program modules that are immediately accessible to and/or presently being operated on by processing unit 332. By way of example, and not limitation, FIG. 4 illustrates operating system 344, application programs 346, other program modules 348, and program data 350.

The computer 330 may also include other removable/non-removable, volatile/nonvolatile computer storage media. For example, FIG. 4 illustrates a hard disk drive 354 that reads from or writes to non-removable, nonvolatile magnetic media. FIG. 4 also shows a magnetic disk drive 356 that reads from or writes to a removable, nonvolatile magnetic disk 358, and an optical disk drive 360 that reads from or writes to a removable, nonvolatile optical disk 362 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 344, and magnetic disk drive 356 and optical disk drive 360 are typically connected to the system bus 336 by a non-volatile memory interface, such as interface 366.

The drives or other mass storage devices and their associated computer storage media discussed above and illustrated in FIG. 4, provide storage of computer readable instructions, data structures, program modules and other data for the computer 330. In FIG. 4, for example, hard disk drive 354 is illustrated as storing operating system 370, application programs 372, other program modules 374, and program data 376. Note that these components can either be the same as or different from operating system 344, application programs 346, other program modules 348, and program data 350. Operating system 370, application programs 372, other program modules 374, and program data 376 are given different numbers here to illustrate that, at a minimum, they are different copies.

A user may enter commands and information into computer 330 through input devices or user interface selection devices such as a keyboard 380 and a pointing device 382 (e.g., a mouse, trackball, pen, or touch pad). Other input devices (not shown) may include a microphone, joystick, game pad, satellite dish, scanner, or the like. These and other input devices are connected to processing unit 332 through a user input interface 384 that is coupled to system bus 336, but may be connected by other interface and bus structures, such as a parallel port, game port, or a Universal Serial Bus (USB). A monitor 388 or other type of display device is also connected to system bus 336 via an interface, such as a video interface 190. In addition to the monitor 388, computers often include other peripheral output devices (not shown) such as a printer and speakers, which may be connected through an output peripheral interface (not shown).

The computer 330 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 330. The logical connections depicted in FIG. 4 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 330 is connected to the LAN 196 through a network interface or adapter 386. When used in a wide area networking environment, computer 330 typically includes a modem 378 or other means for establishing communications over the WAN 198, such as the Internet. The modem 378, which may be internal or external, is connected to system bus 336 via the user input interface 194, or other appropriate mechanism. In a networked environment, program modules depicted relative to computer 330, or portions thereof, may be stored in a remote memory storage device (not shown). By way of example, and not limitation, FIG. 4 illustrates remote application programs 192 as residing on the memory device. It will be appreciated that the network connections shown are exemplary and other means of establishing a communications link between the computers may be used.

Generally, the data processors of computer 330 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 330, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements. In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An apparatus for providing multiplexed video, audio and events indicated by a transmitted signal comprising:
   a video channel for receiving the video and providing a digital video signal corresponding thereto;
   an audio channel for receiving the audio and providing a digital audio signal corresponding thereto;
   a receiver channel for providing a timing signal corresponding to the transmitted signal and representing a timing of the events relative to the video and the audio;
   a media stream multiplexer for multiplexing the digital video signal, the digital audio signal and the timing signal into an ISM (immediately stream-able media) format.

2. The apparatus of claim 1 wherein the video channel comprises a video digitizer, wherein the audio channel comprises an audio digitizer and wherein the receiver channel comprises signal converter logic for converting the transmitted signal into the timing signal.

3. The apparatus of claim 1 wherein each event is a display of one of a sequence of images and wherein the transmitted signal indicates when the display changes from a former image to a subsequent image.

4. The apparatus of claim 3 wherein the display is provided by a podium computer which sequentially displays the images in response to an indication from a user.

5. The apparatus of claim 4 wherein the podium computer includes a mouse and wherein the indication is a mouse click.

6. An apparatus for providing multiplexed video, audio and events comprising:
   a transmitter transmitting a signal corresponding to a timing of the events;
   a receiver receiving the transmitted signal;
   a video channel for converting the video into a digital video signal;
   an audio channel for converting the audio into a digital audio signal;
   a receiver channel responsive to the receiver for providing a timing signal corresponding to the transmitted signal and representing a timing of the events relative to the video and the audio;
   a media stream multiplexer for multiplexing the digital video signal, the digital audio signal and the timing signal into an ISM (immediately stream-able media) format.

7. The apparatus of claim 6 wherein the video channel comprises a video digitizer, wherein the audio channel comprises an audio digitizer and wherein the receiver channel comprises signal converter logic for converting the transmitted signal into the timing signal.

8. The apparatus of claim 6 wherein each event is a display of one of a sequence of images and wherein the transmitted signal indicates when the display changes from a former image to a subsequent image.

9. The apparatus of claim 8 wherein the display is provided by a podium computer which sequentially displays the images in response to an indication from a user.

10. The apparatus of claim 9 wherein the podium computer includes a mouse and wherein the indication is a mouse click.

11. A system for use with a speaker providing audio and video in conjunction with images being provided by a podium computer responsive to the speaker, said system comprising:
    a device for providing video signals and audio signals wherein the video signals correspond to the video provided by the speaker and the audio signals correspond to the audio provided by the speaker;
    a transmitter transmitting a signal corresponding to a timing of images occurring simultaneously with the video and audio;
    a receiver receiving the transmitted signal;
    a video channel for converting the video signal into a digital video signal;
    an audio channel for converting the audio signal into a digital audio signal;
    a receiver channel responsive to the receiver for providing a timing signal corresponding to the transmitted signal and representing a timing of the images relative to the video and the audio;
    a media stream multiplexer for multiplexing the digital video signal, the digital audio signal and the timing signal into an ISM (immediately stream-able media) format.

12. The system of claim 11 wherein the video channel comprises a video digitizer, wherein the audio channel comprises an audio digitizer and wherein the receiver channel comprises signal converter logic for converting the transmitted signal into the timing signal.

13. The system of claim 11 wherein each event is a display of one of a sequence of images and wherein the transmitted signal indicates when the display changes from a former image to a subsequent image.

14. The system of claim 13 wherein the display is provided by a podium computer which sequentially displays the images in response to an indication from a user.

15. The system of claim 14 wherein the podium computer includes a mouse and wherein the indication is a mouse click.

16. In an encoder including a computer readable medium having computer executable instructions for providing multiplexed video, audio and events indicated by a transmitted signal, said instructions comprising:
   video instructions for converting the video into a digital video signal;
   audio instructions for converting the audio into a digital audio signal;
   receiver instructions for providing a timing signal corresponding to the transmitted signal and representing a timing of the events relative to the video and the audio;
   a media stream multiplexer for multiplexing the digital video signal, the digital audio signal and the timing signal into an ISM (immediately stream-able media) format.

17. The instructions of claim 16 wherein the video instructions comprise a video digitizer, wherein the audio instructions comprise an audio digitizer and wherein the receiver instructions comprises signal converter logic for converting the transmitted signal into the timing signal.

18. The instructions of claim 16 wherein each event is a display of one of a sequence of images and wherein the transmitted signal indicates when the display changes from a former image to a subsequent image.

19. The instructions of claim 18 wherein the display is provided by a podium computer which sequentially displays the images in response to an indication from a user.

20. The instructions of claim 19 wherein the podium computer includes a mouse and wherein the indication is a mouse click.

21. A method for providing multiplexed video, audio and events indicated by a transmitted signal comprising:
   converting the video into a digital video signal;
   converting the audio into a digital audio signal;
   generating a timing signal corresponding to the transmitted signal and representing a timing of the events relative to the video and the audio;
   multiplexing the digital video signal, the digital audio signal and the timing signal into an ISM (immediately stream-able media) format.

22. A computer-readable medium having computer-executable instructions that, when executed by a computer, performs the method as recited in claim 21.

23. The method of claim 21 wherein the converting the video comprises digitizing the video and wherein converting the audio comprises digitizing the audio.

24. The method of claim 21 wherein each event is a display of one of a sequence of images and wherein the transmitted signal indicates when the display changes from a former image to a subsequent image.

25. The method of claim 24 wherein the display is provided by a podium computer which sequentially displays the images in response to an indication from a user.

26. The method of claim 25 wherein the podium computer includes a mouse and wherein the indication is a mouse click.

* * * * *